United States Patent [19]

Blount

[11] 4,051,115
[45] Sept. 27, 1977

[54] PROCESS FOR THE PRODUCTION OF LIGNIN SILICATE AND LIGNIN SILICOFORMATE

[76] Inventor: David H. Blount, 5450 Lea St., San Diego, Calif. 92105

[21] Appl. No.: 715,410

[22] Filed: Aug. 18, 1976

Related U.S. Application Data

[63] Continuation-in-part of Ser. No. 598,999, July 25, 1975, abandoned.

[51] Int. Cl.² .............................................. C07G 1/00
[52] U.S. Cl. ................................................ 260/124 R
[58] Field of Search ......................... 260/124 A, 124 R

[56] References Cited
PUBLICATIONS

Brauns, The Chem. of Lignin (1952) 118, 119.

*Primary Examiner*—Delbert R. Phillips

[57] ABSTRACT

A dry granular mixture of silicoformic acid and metasilicic acid, lignin and an alkali catalyst are mixed together, heated and chemically reacted to produce lignin silicate and lignin silicoformate.

8 Claims, No Drawings

PROCESS FOR THE PRODUCTION OF LIGNIN SILICATE AND LIGNIN SILICOFORMATE

CROSS-REFERENCE TO RELATED APPLICATIONS

This Application is a Continuation-in-part of my copending U.S. patent application Ser. No. 598,999, filed July 25, 1975 now abandoned.

BACKGROUND OF THE INVENTION

This invention relates to a process for the production of lignin silicoformate and lignin silicate by heating a mixture of silicoformic acid, metasilicic acid and lignin with an alkali compound as the catalyst to produce lignin silicoformate and lignin silicate. The silicoformic acid and metasilicic acid apparently react chemically with the hydroxyl portion of lignin to form organic silicoformate and organic silicate compounds.

The silicoformic acid and metasilicic acid used in this process were produced by the chemical reaction of a dry alkaline earth metal metasilicate and a dry alkali metal metasilicate with a mineral acid or a hydrogen containing acid salt. The silicic acids are washed with water and filtered to remove the salt, then air dried at 25° to 75° C. The alkali metal carbonate catalyst may be added to the wet silicic acids to produce a pH of 9 to 11, then air dried as outlined in my U.S. Pat. No. 3,962,111. Silicoformic acid, also known as monosilanic acid, may be produced by other methods as outlined in U.S. Pats. Nos. 3,674,430; 3,929,972; 3,954,941 and 3,962,067.

The silicic acid granules produced by the chemical reaction of a dry granular sodium metasilicate with concentrated sulfuric acid or sodium hydrogen sulfate were analyzed by Infrared analysis, using the Infrared KBr disc method. The Infrared analysis showed the presences of Si-H bonds. The Infrared analysis was very similar to that obtained with Mallinckrodt's hydrated silica except for the area of 615 Frequency (cm$^{-1}$), which shows evidence of Si-H bonds. The Mallinckrodt's hydrated silica ($SiO_2 \cdot xH_2O$) has a molecular weight of 60.09 $\cdot xH_2O$. The silicic acids produced contain an active hydrogen which will reduce silver nitrate in an aqueous solution. This is evidence that Si-H bonds are present. The silicic acids produced have a melting point of 1650° C.

In cryoscopic and ebullioscopic determination, the silicic acids produced were not soluble in any common organic solvent but were readily soluble in dilute alkali metal hydroxide aqueous and alcoholic solutions.

The molecular weight was determined from the boiling point elevation of the said silicic acids in a 6N sodium hydroxide aqueous solution and indicated a molecular weight of 78 ± 25 gm/mol. This type of reactive solution normally changes the molecular species. The silicic acids readily react with the sodium hydroxide; however, this would seen to indicate the absence of a polymeric form of silicate. On hydroflouric acid determination of the silicon content, it is found to be in the ratio of one mol of silicon to two mols of hydrogen and oxygen, giving a general formula of $H_2SiO_2$. It has the physical activity of an acid, giving a general formula of H.SiO.OH which is silicoformic acid. By using the molecular weight and considering the active hydrogen present, the analysis indicates a possible formula of $HSi(OH)_3$ which is orthosilicoformic acid. The orthosilicoformic acid, when dried, will lose water to form silicoformic acid. The silicic acid contains about 30% to 40% of a silicic acid (metasilicic acid), which does not contain an active hydrogen (Si—H) and has a molecular weight of 78 ± 25 gm/mol.

Lignin may be produced from wood by several methods. It may be recovered from the waste liquors obtained from the pulping of wood by the acid sulfite process which produces a material known as sulfite lignin. In the Kraft or soda process, the waste liquors are treated by acidification, and sulfate lignin is produced. Lignin may be extracted from wood by using organic solvents. The sulfite lignin may be partially desulfonated and utilized in my process.

Various alkali metal carbonates, hydroxides and oxides may be used as the catalyst, such as sodium carbonate, potassium carbonate, sodium hydroxide and potassium hydroxide. Alkali metal salts of weak acids, such as sodium silicate and other alkali substances may also be used as the catalyst in the silicic acid and lignin reaction.

The silicic acid is reacted with lignin in the ratio of 1 to 2 parts by weight. The ratio may vary, depending on the available hydroxyl groups in the lignin. The alkali compound is added to adjust the pH to 9 to 11. Sodium carbonate is the preferred alkali catalyst. The mixture is heated to 50° to 100° C until the lignin softens and is mixed with the silicic acids; they combine chemically in about 20 to 60 minutes to form a dark gray granular compound, lignin silicoformate and silicate. Lignin silicoformate and lignin silicate are soluble in water, in water soluble organic chemicals, in acetone and other organic solvents. Lignin silicoformate and lignin silicate, in an aqueous solution, will precipitate when the solution is made acid to a pH of 4 to 5.

Lignin silicoformate and lignin silicate will form useful condensation products with aldehydes, furans and epoxy compounds. These condensation products may be used as molding powders, as protective coatings on wood and as ingredients in paints and varnishes.

Lignin silicoformate and lignin silicate may be co-polymerized with phenols, ureas, urethanes, vinyl acetate, acetonitrile, acrylonitrile, acrylic acid, vinyl compounds, rubber, isoprene, butadienes, styrenes, polysulfides and drying oils. Lignin silicoformate and lignin silicate may be treated with a perioxide to produce a black rubbery compound and may be used as a calking compound.

Lignin silicoformate and lignin silicate may be used in the production of plastics, molding powders, cast resins, coating resins, laminates, paints, enamels and varnishes. They may be used as a filler in phenoplast, silicophenoplast, aminoplast, silicoaminoplast, furan resins, natural rubber, GR-S rubber, nitrile rubber and neoprene elastomer.

The primary object of the present invention is to produce lignin silicoformate and lignin silicate, A further object is to provide a new useful organic silicoformate and organic silicate compounds. Still another object is to produce useful organic silicoformate and organic silicate compounds that can be co-polymerized into useful products. A further object is to produce an organic silicoformate and organic silicate that is soluble in aqueous and organic solvents.

DETAILED DESCRIPTION OF THE INVENTION

While details of the mechanism of the reaction which I obtain are not fully understood it is thought that the basic reaction takes place as follows:

1. To produce silicoformic acid and metasilicic acid:

(a)

(b)

The reaction discussed above may be conducted under any suitable physical conditions. While the reactants may be mixed in any suitable proportions, generally approximately stoichiometric proportions are preferred; thus the formation of lignin silicoformate and lignin silicate.

While the reactants may be brought into contact in any suitable manner, mixing in dry form is generally preferred. The reaction may be conducted at any suitable temperature. The reaction may be conducted at any suitable pressure, but ambient pressure is preferred.

An alkali catalyst appears to enhance the reaction to produce lignin silicoformate and silicate. The concentration of the alkali may vary from 1% to 10% by weight of the reactants, lignin, silicoformic acid and metasilicic acid. An excess of alkali catalyst should be avoided since the alkali metal hydroxides will react chemically with the silicic acids. Sodium carbonate is the preferred catalyst.

DESCRIPTION OF PREFERRED EMBODIMENTS

My invention will be illustrated in greater detail in the following Examples which describe various preferred embodiments of the process of this invention. These Examples are merely illustrative of novel processes and do not limit the procedures which may be used in the production of my novel lignin silicoformate and lignin silicate compounds. Parts and percentages are by weight unless otherwise indicated.

EXAMPLE I

Dry granular sodium metasilicate pentahydrate is slowly added to concentrated (60% to 98%) sulfuric acid in the ratio of 1:1 mols. The mixture is agitated at ambient pressure and the temperature is kept below 100° C. Oxygen evolves from the mixture. The reaction is completed in 4 to 8 hours, thereby producing a mixture of silicoformic acid, metasilicic acid and sodium sulfate. The mixture is washed with water and filtered to remove the sodium sulfate from the white granular mixture of silicoformic acid and metasilicic acid. The silicic acid mixture is then washed with a dilute solution of sodium carbonate, then filtered, leaving the pH 9 to 11. The silicic acid mixture is then air dried at 25° to 75° C.

About one part by weight of the white granular mixture of silicoformic acid and metasilicic acid, containing the sodium carbonate catalyst are mixed with about 2 parts by weight of sulfate lignin. The mixture is then heated to 50° to 100° C while agitating at ambient pressure for 20 to 60 minutes, thereby producing a dark gray granular mixture of sulfate lignin silicoformate and sulfate lignin silicate.

EXAMPLE II

Dry granular sodium metasilicate is mixed with sodium hydrogen sulfate in the ratio of 1 to 2 mols. The mixture is agitated at ambient pressure, and the chemical reaction starts in 5 to 10 minutes; the temperature is kept below 100° C; oxygen evolves; the chemical reaction is completed in 4 to 8 hours, thereby producing a white granular mixture of silicoformic acid, metasilicic acid and sodium sulfate. The mixture is washed with water then filtered to remove the sodium sulfate. The silicoformic acid and metasilicic acid mixture is air dried at 25° to 75° C.

About 2 parts by weight of the mixture of silicoformic acid and metasilicic acid, about 3 parts by weight of sulfate lignin and 0.5 parts by weight of potassium carbonate are mixed. The mixture is then heated to 50° to 100° C at ambient pressure while agitating for 20 to 60 minutes, thereby producing a dark gray granular mixture of sulfate lignin silicoformate and sulfate lignin silicate.

EXAMPLE III

About 1 part by weight of the white granular mixture of silicoformic acid and metasilicic acid as produced in Example I, containing the sodium carbonate catalyst, is mixed with 3 parts by weight of sulfate lignin. The mixture is then heated to 50° to 100° C while agitating for 20 to 60 minutes at ambient pressure, thereby producing a dark gray, granular mixture of sulfate lignin silicoformate and sulfate lignin silicate.

EXAMPLE IV

About 1 part by weight of the mixture of silicoformic acid and metasilicic acid as produced in Example II is mixed with about 2 parts by weight of sulfate lignin. About 0.1 parts by weight of sodium hydroxide is added to the mixture; then the mixture is heated to 50° to 100° C while agitating for 20 to 60 minutes, thereby producing a dark gray, granular mixture of sulfate lignin silicoformate and sulfate lignin silicate.

EXAMPLE V

About 1 part by weight of the mixture of silicoformic acid and metasilicic acid as produced in Example II, about 2 parts by weight of sulfate lignin, about 0.2 parts by weight of sodium carbonate and 4 parts by weight of water are mixed then heated to 50° to 105° C while agitating until the water is evaporated. The mixture is then heated while agitating at ambient pressure for 20 to 60 minutes, thereby producing a dark gray granular mixture of sulfate lignin silicoformate and sulfate lignin silicate.

EXAMPLE VI

About 1 part by weight of the mixture of silicoformic acid and metasilicic acid as produced in Example I, about 2 parts by weight of partially desulfonated sulfite lignin, about 0.3 parts by weight of potassium carbonate, and about 3 parts by weight of water are mixed. The mixture is then heated to 50° to 105° while agitating until the water evaporates. The mixture is then heated to 50° to 100° C while agitating for 20 to 60 minutes, thereby producing a dark gray, granular mixture of partially desulfonated sulfite lignin silicoformate and partially desulfonated sulfite lignin silicate.

While specific proportions, ingredients and conditions were detailed in the above Examples, these may be varied within the scope of these disclosures with similar results. For example, catalysts or other agents may be utilized to enhance or modify these reactions. Other ramifications, applications and variations of the invention will occur to those skilled in the art upon reading this disclosure. These are intended to be included within the scope of this invention as defined in the appended claims.

I claim:

1. The process for the production of sulfate lignin silicoformate and sulfate lignin silicate by the following steps:
   a. dry granular alkali metal metasilicate is slowly added to concentrated mineral acid in the ratio of 1 to 1 mols over a period fo 15 to 45 minutes, while agitating and keeping the temperature between 25° to 85° C; the chemical reaction is completed in 4 to 12 hours, thereby
   b. producing a white granular mixture of silicoformic acid, metasilicic acid and salt; then by
   c. washing with water and filtering, the salt is removed, thereby
   d. recovering silicoformic acid and metasilicic acid; then
   e. a residue of alkali metal carbonate is added to the silicoformic acid and metasilicic acid by adding an aqueous solution containing 10% to 25% alkali metal carbonate until the pH is 9 to 11, then filtering and air drying at 25° to 85° C; then
   f. mixing about 1 to 2 parts by weight of the mixture of silicoformic acid and metasilicic acid with about 3 parts by weight of a lignin compound, then heating the mixture to 50° to 100° C while agitating for 20 to 60 minutes, thereby
   g. producing sulfate lignin silicoformate and sulfate lignin silicate.

2. The method of claim 1 wherein the alkali metal metasilicate is sodium metasilicate pentahydrate.

3. The method of claim 1 wherein the concentrated mineral acid is sulfuric acid.

4. The method of claim 1 wherein the alkali metal carbonate is sodium carbonate.

5. The method of claim 1 wherein the alkali metal carbonate is potassium carbonate.

6. The method of claim 1 wherein the sulfate lignin is produced by the kraft or soda process and the waste liquors are treated by acidification to produce sulfate lignin.

7. The method of claim 1 wherein the alkali metal metasilicate is a dry granular sodium metasilicate.

8. The product produced by the method of claim 1.

* * * * *